United States Patent Office 2,767,025
Patented Oct. 16, 1956

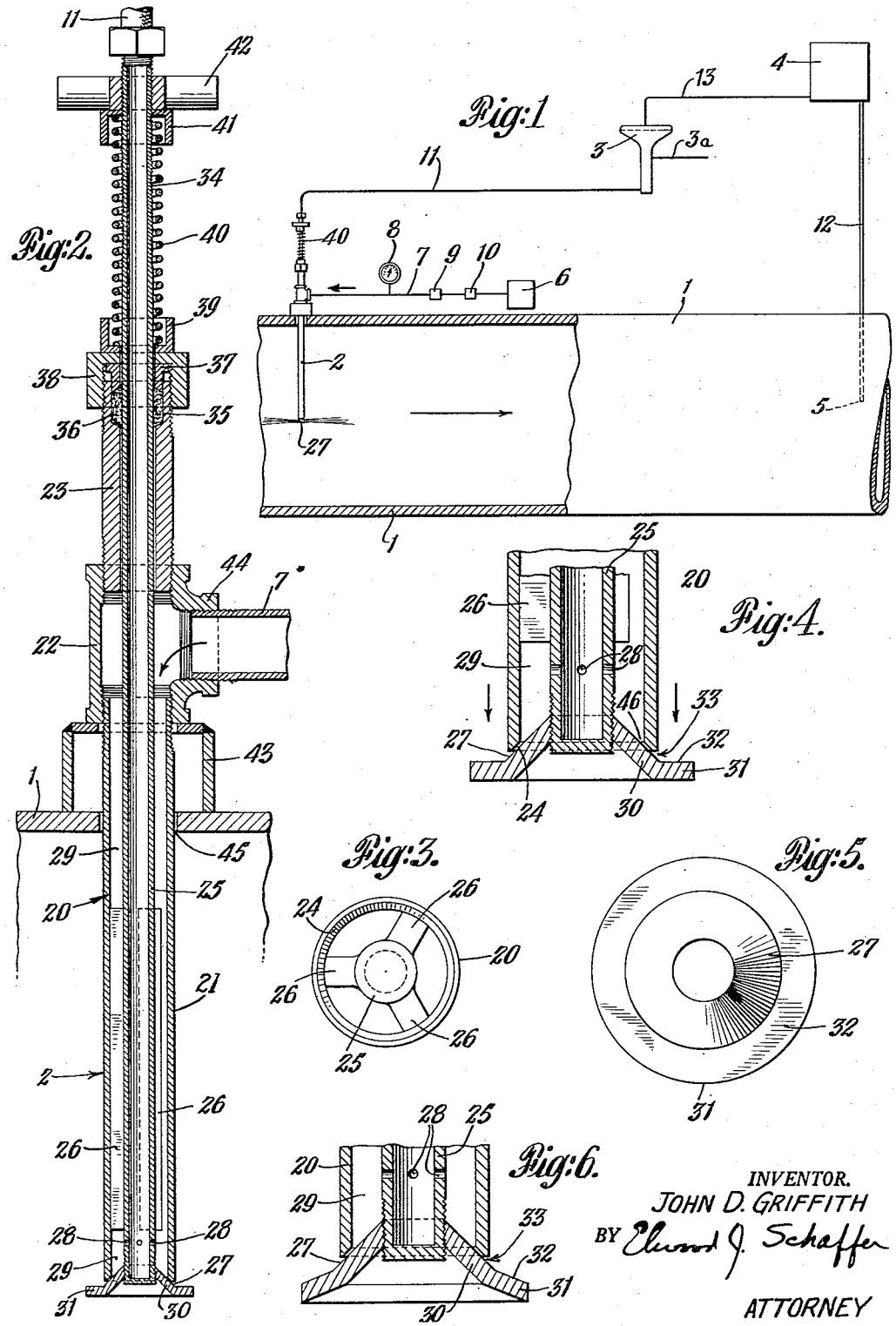

2,767,025

APPARATUS FOR COOLING GASES

John D. Griffith, Tacoma, Wash., assignor to American Smelting and Refining Company, New York, N. Y., a corporation of New Jersey Application October 7, 1953, Serial No. 384,549

4 Claims. (Cl. 299—133)

This invention relates to an apparatus for cooling gases with a liquid. More particularly, it relates to a gas cooling system, a spray head for injecting liquid into a gas to be cooled, and a method for operating the system and the spray head.

The system comprehends a conduit for a stream of the hot gases to be cooled, into which one or more elongated spray heads are disposed with the spray end of the spray head inserted into the conduit with the axis of the spray at an angle to the axis of the conduit. The spray head is provided with an elongated outer conduit having at its spray end a valve element with a smooth, even contacting surface thereon. Concentrically and slidably supported in the outer conduit is an elongated inner conduit also provided with a valve element having a smooth, even contacting surface disposed on the spray end of the inner conduit. One of the valve elements is a valve seat and the other a valve head; these two elements cooperate to provide the only fluid outlet from the spray head. The inner conduit is provided with a plurality of openings adjacent the valve element thereon, with the openings communicating between the inner conduit and the annulus between the inner and outer conduits. The valve elements on the inner and outer conduits are constructed and arranged to move away from each other upon the application of fluid pressure in the annulus, thereby to unseat the valve constituted by the valve elements. A spring is associated with the inner and outer conduits and adjustable means are associated with the spring to bias it so as to urge the valve head upon the valve seat.

Included also in the system are means supplying compressed gas at a controlled pressure to one of the conduits of the spray head. The compressed gas means is capable of supplying gas at a pressure which, when bearing against the valve, is sufficient to overcome the spring bias. Means connected to the other of the spray head conduits are also provided to supply thereto a liquid coolant under a pressure at least equal to the pressure of the compressed gas. Connected to the liquid supply means are means responsive to the temperature of the hot gases in the hot gas conduit for controlling the flow of liquid to the spray head.

For best results, the axis of the spray head, when disposed in the hot gas conduit, is substantially at right angles to the axis of the hot gas conduit, the compressed gas is led directly into the annulus between the two conduits in the spray head, and the liquid under pressure is connected to the inner spray head conduit. Also, the valve seat element is disposed on the spray end of the outer conduit and the valve head on the same end of the inner conduit and outwardly of the valve seat. The valve head is also provided with means, including an annular flange attached to the periphery of the valve head and disposed beyond and outside the valve seat, to control the pattern of the fluids injected into the hot gas from the spray head. Preferably, the contacting surface of the valve seat is an inwardly bevelled surface. Preferably also, the valve head is provided with a conical body portion presenting an inwardly converging contacting surface corresponding to the taper of the bevelled valve seat. The peripheral flange preferably is flat and is attached to the conical valve head at the end having the larger diameter, with the plane of the flange at right angles to the longitudinal axis of the spray head. In addition, it is preferred that the spray head be vertically disposed when it is in operating position in the hot gas conduit.

When the system is in operation, the compressed gas is introduced continuously into one of the spray head conduits at a pressure which is at least sufficiently great to overcome the bias of the spring and to unseat the valve head from the valve seat when no liquid coolant is fed to the spray head, thereby providing a continuous stream of compressed gas passing between the valve head and the valve seat and into the hot gas stream, regardless of whether liquid coolant is also fed to the spray head. A liquid coolant is introduced into the other of the spray head conduits at a pressure at least equal to that of the compressed gas and at a regulated rate sufficient, when injected into the hot gas stream, to cool the stream to a desired temperature. Any coolant led to the spray head is fed into the hot gas stream with the compressed gas. Introduction of the coolant to the spray head is discontinued during any period in which the gases to be cooled are at or below the desired temperature.

For best results, the pressure of the compressed gas which overcomes the bias of the spring is sufficiently high to insure atomization of the liquid coolant as it is injected into the hot gas stream. For best results also under these conditions, the gas pressure is slightly in excess of that required to overcome the spring bias, thereby assuring the continuous escape of at least a small amount of the compressed gas through the valve on the spray head. Under these conditions, the valve may be said to be in the "cracked" position. Preferably, the liquid coolant is water, the compressed gas is air, the hot gases are to be cooled to a temperature above the boiling point of water, and the valve head and valve seat present smooth, even contacting surfaces to each other. Preferably also, the spray end of the spray head is inserted into the hottest portion of the hot gas stream and as far as possible from the surfaces of the hot gas conduit. Atomizing gas pressure is dependent largely upon the dimensions of the valve and the diameter of the fluid conduits, especially that of the compressed gas conduit. In general, as these dimensions are increased, the gas pressure required to atomize the coolant is decreased. Air pressures in the range of about 15–50 pounds per square inch have been found to be generally effective, although higher and lower pressures may also be used.

In operating the system, especially in starting it initially or after a shutdown, the preferred procedure is to supply compressed gas to the spray head at the desired pressure. The spring bias is then adjusted so as to place the valve in the "cracked" position and permit a small, uniform stream of gas to escape from the valve in the spray head. Liquid coolant is then fed to the spray head at a pressure sufficiently above the pressure of the compressed gas to permit the liquid to flow into the spray head for example at a pressure about 5–10 pounds per square inch above the compressed gas pressure. The spray pattern is then observed and the spring bias may be further adjusted to form the optimum spray pattern. Such additional adjustment of the spring bias, when required, is slight and does not materially affect the position of the valve elements or amount of compressed gas escaping from the spray head when the liquid coolant is turned off. In an alternative, although not as desirable, procedure, the spring bias may first be adjusted to a desired value, after which the pressure of the compressed gas may be adjusted to open the valve to the "cracked" position and to adjust the spray to the desired pattern.

The invention may be used to cool any gas to any desired temperature. It is especially useful in cooling hot industrial gases to a temperature above the boiling point of the liquid coolant. It is particularly useful in situations where varying demands are made on the cooling system such as, for example, where the temperature of the gas to be cooled fluctuates over a wide range including temperatures at or below that to which it is desired to cool the gases.

One of the principal objects and advantages of the invention is that the continuous leakage of air through the valve maintains the spray head at a moderate temperature when it is exposed to gases at an elevated temperature and no liquid coolant is fed to the spray head. Distortion or other damage which would otherwise take place due to the shock of violent changes in temperature of the spray head, is thereby minimized or eliminated.

Another important object and advantage of the invention is that the valve seat, the valve head and the flange thereon are kept clean by the continuous sweep of the compressed gas over the surfaces of these elements, further reducing maintenance costs and also preventing distortion of the spray pattern. This cleaning feature is especially important where the gases to be cooled are dirty, i. e., those containing grit or corrosive material or both.

Still another important object and advantage is that, by ejecting a mixture of a compressed gas and liquid coolant from the spray head, lower liquid pressure is required to atomize the liquid than would be the case when the liquid alone is used. Additionally, the amount of liquid coolant ejected by the spray is automatically controlled as required by the temperature of the gases to be cooled. Thus, the rate at which liquid is fed to the spray head is gradually changed as either or both the volume and temperature of the gases to be cooled are changed, thereby eliminating pressure and temperature shocks to the cooling system which would otherwise arise by the simple turning on and off of banks of sprays.

Further important objects and advantages of the invention are as follows. The pattern of the spray is adjustable and the spray end, or nozzle, of the spray head may be placed in an optimum position in the flue, for example in the hottest part of the gas stream and as far as possible from the side walls of the conduit for the hot gases to be cooled. Also, when in an atomized condition, the liquid coolant injected into the gas is rapidly converted into a vapor; the heat of vaporization being taken from the hot gases which are thereby cooled. Wetting of the inside surfaces of the hot gas conduit by droplets or a spray of unvaporized coolant is prevented by these features, and results in a reduction or an elimination of damage to the conduit. Elimination of wetting of the flue is especially advantageous in the case of metallic flues which are exposed to dirty, corrosive gases at high temperatures, for example those on the order of about 700° F. upward to 1300° F. and higher.

These and other objects and advantages will become apparent from the following more detailed description of the invention.

The invention is further illustrated in the accompanying drawings and example. It should be understood, however, that the drawings and the example are given for purposes of illustration and that the invention in its broader aspects is not limited thereto.

In the drawings, Fig. 1 is a general assembly illustrating the cooling system diagrammatically.

Fig. 2 is a vertical, longitudinal section of the spray nozzle.

Fig. 3 is an end view of the spray nozzle showing the valve seat with the valve head removed.

Fig. 4 is an enlarged vertical section showing the valve head and the valve seat in their normal position when the liquid coolant is cut off.

Fig. 5 is a face view of the valve head taken in the direction of the arrows as shown in Fig. 4.

Fig. 6 is a cross-section of a valve head illustrating an alternative construction.

Referring now to the drawings, in Fig. 1 there is shown a combination of a conduit 1 containing a stream of hot gases to be cooled, an elongated spray head 2, diaphragm controlled valve 3, pneumatic recorder-controller 4, thermocouple 5, air compressor 6, compressed air conduit 7 provided with air pressure gauge 8, air pressure control valve 9, air check valve 10, and conduit 11. The latter two conduits respectively lead compressed air and water under pressure to the spray head 2. The elongated spray head 2 is inserted into conduit 1 with the longitudinal axis of the spray head at an angle, preferably substantially about 90°, to the longitudinal axis of the conduit. Preferably, the spray end, or nozzle portion, of the spray head is downwardly disposed in or adjacent the region of the cross-section of the conduit in which the gases to be cooled therein are hottest. One or more spray heads may be inserted in conduit 1 along its length, preferably with at least one spray head located along the length of the conduit where the gases are at their highest temperature.

The thermocouple 5 is located in the conduit 1 in contact with the gases therein at a point which is away from the spray head, or system of spray heads, which it controls, in the direction of flow of the gases. The thermocouple 5 is electrically connected through lead 12 to recorder-controller 4. The recorder-controller is of well known construction and feeds compressed air through pipe 13 at an appropriate pressure to one side of a diaphragm in the diaphragm-controlled valve 3 in response to temperature fluctuations of the hot gases in conduit 1, as indicated by the thermocouple. The diaphragm-controlled valve 3, which is supplied with water by conduit 3a from a source not shown, is thus closed or opened to the extent required by the temperature of the gases in the conduit 1 to control the flow of water through conduit 11 to spray head 2.

The spray head 2 may be fabricated of any suitable material, for example steel, brass and the like. Details of the construction of the spray head are shown in Figs. 2–5 of the drawings. Referring to these figures, there is shown an outer conduit 20 having an elongated pipe portion 21, at least a portion of which is insertable into conduit 1, T element 22 which may be threaded or otherwise attached to the pipe portion, and sleeve 23 which may also be threaded or otherwise appropriately attached to the T element. The spray, or nozzle, end of pipe 21, which is insertable into conduit 1, is provided with valve seat 24 formed as an inwardly bevelled surface which presents a smooth, even contacting surface for a valve head.

Inner conduit 25 is concentrically disposed in outer conduit 20 and is slidably supported therein by spider guide 26 and sleeve 23. The nozzle end of the conduit 25 is closed and is provided with valve head 27. The spray end portion of the conduit 25 is also provided with a plurality of openings 28 adjacent the valve element 27 to provide fluid communication between the conduit 25 and the annulus 29 between the inner and outer conduit 20. The openings 28 are preferably uniformly distributed about the diameter of conduit 25. Additionally, it is preferred that these openings be located approximately the same linear distance from the valve head 27 to assure a uniform distribution of liquid coolant around the valve head and seat. Any number, greater than one, of the openings 28 may be used although four of such openings are preferred. When higher rates of ejection of the coolant are desired, additional openings may be provided in the conduit 25 between the inner end of sleeve 23 and the valve head 27. Such additional openings, if used, are preferably located between the sleeve 23 and the guide 26.

The valve head 27 presents a smooth, even contacting surface to the valve seat 24. Preferably, the valve head is removably attached to conduit 25 and is provided with an inwardly converging body portion 30 which bears the smooth, even contacting surface which is presented to the preferred bevelled valve seat 24. The valve head 27 is further provided with a peripheral flange 31 attached to the conical portion of the valve head at the end having the larger diameter. The flange 31 preferably presents a flat surface 32 which is at an angle to the fluid emerging from the valve 33 constituted by the valve elements 27 and 24. The surface 32 preferably also is at right angles to the axis of the spray head.

The width of the flange 31 preferably is sufficient to insure a spray pattern which conforms generally to the slope of surface 32, although a narrower flange may also be used, if desired. In its preferred form, valve head 27 and the flange thereon provide a spray pattern which lies generally in a plane at right angles to the axis of the spray head, as is illustrated in Fig. 1. Alternatively, the surface 32 of the flange 31 may be sloped so as to form a conical spray pattern. This may be accomplished by causing the surface 32 to form an angle with respect to a plane which is perpendicular to the axis of the spray head. A valve head with this type of construction is illustrated in Fig. 6. Alternatively also, either or both the slope of surface 32 and a relatively narrow flange may be used to form a conical spray pattern.

The end portion 34 of the inner conduit away from the spray end of spray head 2 extends beyond the sleeve 23 emerging therefrom in a fluid-tight connection. The inside surface of the outer sleeve 23 is provided with an annular recess 35 which is adapted to receive packing 36. Packing compressor, or boss, 37 is pressed against the packing 36 to compress the packing and seal the annular space between the sleeve 23 and the outer surface of inner conduit 25. The packing compressor 37 is urged upon the packing by nut 38 which is threaded on the outside surface of the end portion of sleeve 23.

Abutting against the surface of nut 38 is spring retainer 39 which is slidably mounted on the end portion 34 of conduit 25. Spring 40 is also slidably mounted on the portion 34, with the inner end of the spring abutting against the spring retainer 39. The outer end of the spring abuts against spring retainer 41, likewise slidably mounted on the end portion 34. Abutting against the spring retainer 41 is lock nut 42 which is adjustably mounted on the portion 34 by any suitable means, for example by threading. The force with which the valve head 27 is urged to seat upon the valve seat 24 is adjusted as desired by adjusting the position of lock nut on the end portion 34 to compress spring 40 to an appropriate degree.

Mounted on the outside of conduit 20 is support socket 43 for supporting the spray head 2 in a desired position when it is inserted into conduit 1. The support socket may be fixedly attached to the outer conduit 20 and to conduit 1. It may also be adjustably mounted on either or both the conduit 20 and the conduit 1 to permit the spray end of the spray head to be placed in various positions in the conduit 1, either or both by adjusting the length of the spray head inserted into the conduit 1 or the angle of the axis of the spray end of the spray head with respect to the axis of the conduit.

Compressed air and water under pressure preferably are fed to the spray head 2, as shown in Fig. 1. Compressed air conduit 7 is connected to inlet 44 in the T element 22. The compressed air from conduit 7 passes through the T element into the annulus 29 from which it escapes from the spray head through valve 33. The water pipe 11 is connected to the inlet on conduit 25 located on the end of portion 34. The water enters directly into conduit 25. It passes through this latter conduit and openings 28 therein into the annulus 29 and is then ejected from the spray head with the compressed air. The spray head is inserted through opening 45 in conduit 1 with the spray, or nozzle, end disposed in the optimum position therein, taking into consideration the configuration of the hot gas conduit and the condition of the gases passing therethrough. Preferably, the spray head is disposed downwardly with respect to the conduit as shown in Fig. 1 with the spray, or nozzle, end located at or in the vicinity of the center of the conduit where the gases are generally at their highest temperature and there is least possibility of unvaporized liquid coolant reaching and wetting the inside surface of conduit 1.

In the preferred mode of operating the system, compressed air from air compressor 6 is delivered to the spray head at a desired pressure controlled by valve 9, as indicated by pressure indicator 8. The compression on the spring 40 is adjusted by adjusting the position of lock nut 42 on the end portion 34 until a small but uniform amount of air escapes through valve 33. After such, or any other, adjustment of the lock nut, the spring 40 may be further compressed temporarily by pressing on the lock nut with the hand or other suitable instrument, and then releasing to make certain that the packing 36 and the guide 26 are not binding the conduit 25. As indicated earlier, the pressure of the air or other gas entering the spray head preferably is sufficiently high to insure the atomization of the liquid coolant when it is ejected from the spray head with the compressed gas.

When thus adjusted and no liquid coolant is fed to the spray head, the valve 33 is normally slightly unseated as is illustrated by the opening 46 between valve seat 24 and valve head 27 in the enlarged view of Fig. 4. This is an important feature of the invention as the escaping, compressed gas sweeps clean the surface 32 of flange 31 and the contacting surfaces of the valve head 27 and valve seat 24. Such cleaning action reduces or eliminates corrosion of these surfaces and distortion of the spray pattern, and reduces generally the maintenance cost of the spray head and system. In addition, the continuous leakage of a minimum quantity of the relatively cool compressed air or other gas through the spray head protects the spray head when no liquid coolant is fed thereto, such as when the temperature of the gas in conduit 1 is at or below the desired temperature but still high enough to otherwise damage the spray head. At the same time, the gases in conduit 1 are not unduly diluted with the compressed gas escaping from the spray head. This cooling effect results in a further reduction of damage to the spray head and a lowering of maintenance costs.

Water or other liquid coolant, as needed to cool the gases in conduit 1 to a desired temperature, is fed to the spray head at a pressure sufficiently greater than that of the compressed gas to maintain a rate of delivery of the liquid coolant which is established and controlled by the thermostat 5. When injected into the hot gases in the preferred atomized condition, the liquid coolant is rapidly converted to a vapor, thereby cooling the gases at a maximum rate by absorption of heat of vaporization. The rapid vaporization of the atomized coolant also assists in preventing or reducing the possibility of coolant contacting the inside walls of the conduit in the form of a liquid. Such contact by liquid coolant is highly undesirable as it tends to damage the conduit, especially when the conduit is fabricated of a metal such as steel, and the gases therein are at an elevated temperature and are of a corrosive nature when in contact with a liquid.

The spray pattern of the ejected liquid coolant is also important in that it affects the rate at which the liquid coolant is vaporized. For any given compressed gas pressure and any given compression on spring 40, the pattern is controlled by the slope of the surface 32 on flange 31 and this slope in relation to the shape of the surfaces on valve seat 24 and valve head 27. As stated earlier, these surfaces preferably are formed as shown in the drawings, especially Figs. 2 through 5. Briefly stated, the surface 32 is flat and at a right angle to the axis of the spray head. The valve seat 24 is inwardly bevelled and the body portion of the valve head 27 is conical with an inwardly converging conical surface conforming to the bevel of the valve seat. With this type of construction, the spray pattern lies generally in the same plane as the slope of surface 32. The spray pattern is generally parallel to the flow of the hot gases when the spray head is inserted in conduit 1 with the axis of the spray head perpendicular to the axis of the spray, as is illustrated in Fig. 1. If desired, especially when the cross-sectional dimensions of the hot gas conduit are relatively small, the surface 32 may be sloped as indicated in Fig. 6 to a desirable degree to form a conical spray pattern.

It has been found that when relatively low compressed gas pressures are used in the spray head, satisfactory atomization of the liquid coolant does not take place unless the contacting surfaces of the valve seat 24 and the valve head 27 are smooth and even. Thus, when shallow slots were cut at uniformly spaced positions on the valve seat 24 and a relatively low air pressure was used, the spray pattern and the atomization of the liquid coolant were unsatisfactory. When higher air pressures were used with the slotted construction, the spray pattern and the degree of atomization improved somewhat but were still considerably inferior to that obtained when the valve seat presented a smooth, even surface to the valve head. Also, an undesirably large amount of air escaped from the slots cut in the valve seat, particularly when the temperatures of the hot gases in the hot gas conduit were such as to require no coolant to be injected therein.

With any given air pressure together with any given configuration of the valve seat, the valve head and the flange, the spray pattern is also affected by the compression on the spring 40. This also is an important feature of the invention. Thus, when the compression on the spring 40 has been adjusted to afford a small but uniform amount of air to escape from the spray head at the desired air pressure, the lock nut 42 preferably is further adjusted to produce an optimum form in the spray pattern. Such additional adjustment of the compression on spring 40 is most conveniently made by observing the pattern of the spray as the spring compression is adjusted. Any such additional adjustment of the spring compression that may be required, has been found to be slight and does not materially affect the quantity of the compressed gases escaping from the spray head. However, unless the initial adjustment of the spring compression accidentally coincides with that for the optimum spray pattern, the additional adjustment of the spring compression can materially affect the pattern of the spray.

The invention has been practiced under a variety of conditions to cool the hot gases in a flue leading from a copper converter. The gases to be cooled were at times at a temperature of 1300° F. and higher, and were cooled to a desired temperature which, for various purposes, was varied from 700° to 1100° F. and higher. The converter gases contained a considerable amount of dust and were corrosive in nature. In the course of use over a period of three months no visible damage or corrosion occurred to the spray head or the conduit even though the supply of water to the spray head was turned off and the spray head was exposed to gas temperatures up to about 1300° F. for various periods during the three months' period.

What is claimed is:

1. A water spray head comprising an elongated outer conduit provided with a smooth even surfaced valve seat attached to the spray end thereof, an elongated inner conduit concentrically and slidably supported in said outer conduit, the spray end of said inner conduit being closed, a valve head disposed on the spray end of said inner conduit outward of said valve seat and adapted to move outwardly of the latter when the valve is unseated, said valve head also presenting a smooth even contacting surface to said valve seat, a plurality of openings in said inner conduit adjacent the valve head thereon communicating with the annulus between said inner and outer conduits, a spring removably attached to said inner and outer conduits adjacent the conduit ends which are away from the spray end thereof, adjustable means associated with said spring to bias the spring to urge the valve head upon the valve seat, a gas inlet on said outer conduit to admit a gas under pressure to the annulus between said conduits, an inlet for a liquid on said inner conduit, sealing means in the end of said annulus which is away from said spray end sealing the corresponding end of the spray head, and an annular flange attached to and forming the outer periphery of said valve head.

2. A spray head according to claim 1 in which the contacting surface of said valve seat is an inwardly bevelled surface, the valve head is provided with a conical body portion presenting an inwardly converging contacting surface corresponding to the taper of the bevelled valve seat, said peripheral flange is flat and is attached to the conical valve head at the end having the larger diameter, and the plane of said flange is at right angles to the longitudinal axis of the spray head.

3. A spray head according to claim 1 in which the contacting surface of said valve seat is an inwardly bevelled surface, the valve head is provided with a conical body portion presenting an inwardly converging contacting surface corresponding to the taper of the bevelled valve seat, and said peripheral flange is attached to the conical valve head at the end of the latter having the larger diameter, said flange also being conical and diverging outwardly of said inner conduit whereby a conical spray pattern is formed by the spray head.

4. A spray head comprising an outer conduit provided with a smooth even surfaced valve seat attached to the spray end thereof, an inner conduit slidably supported in said outer conduit, a valve head disposed on the spray end of said inner conduit outward of said valve seat and adapted to move outwardly of the latter when the valve is unseated, said valve head also presenting a smooth even contacting surface to said valve seat, a plurality of openings in said inner conduit communicating with the annulus between said inner and outer conduits, means associated with said spray head for urging the valve head upon the valve seat, an inlet on said outer conduit to admit a fluid under pressure to the annulus between said conduits, an inlet for a fluid on said inner conduit, sealing means in said annulus between the conduits, said sealing means being located away from the spray end of the spray head beyond said fluid inlet on the outer conduit and said openings of said inner conduit which communicate with said annulus between said conduits, and an annular flange attached to and forming the outer periphery of said valve head.

References Cited in the file of this patent

UNITED STATES PATENTS

| | | |
|---|---|---|
| 1,272,895 | Beede | July 16, 1918 |
| 1,466,291 | Beeby | Aug. 28, 1923 |
| 1,866,193 | Coutant | July 5, 1932 |
| 2,151,079 | Bowen | Mar. 21, 1939 |
| 2,176,838 | Fulton | Oct. 17, 1939 |
| 2,276,055 | Mastenbrook | Mar. 10, 1942 |
| 2,470,519 | Peterson et al. | May 17, 1949 |
| 2,519,200 | Schumann | Aug. 15, 1950 |
| 2,541,316 | Winkler | Feb. 13, 1951 |
| 2,550,683 | Fletcher et al. | May 1, 1951 |